UNITED STATES PATENT OFFICE.

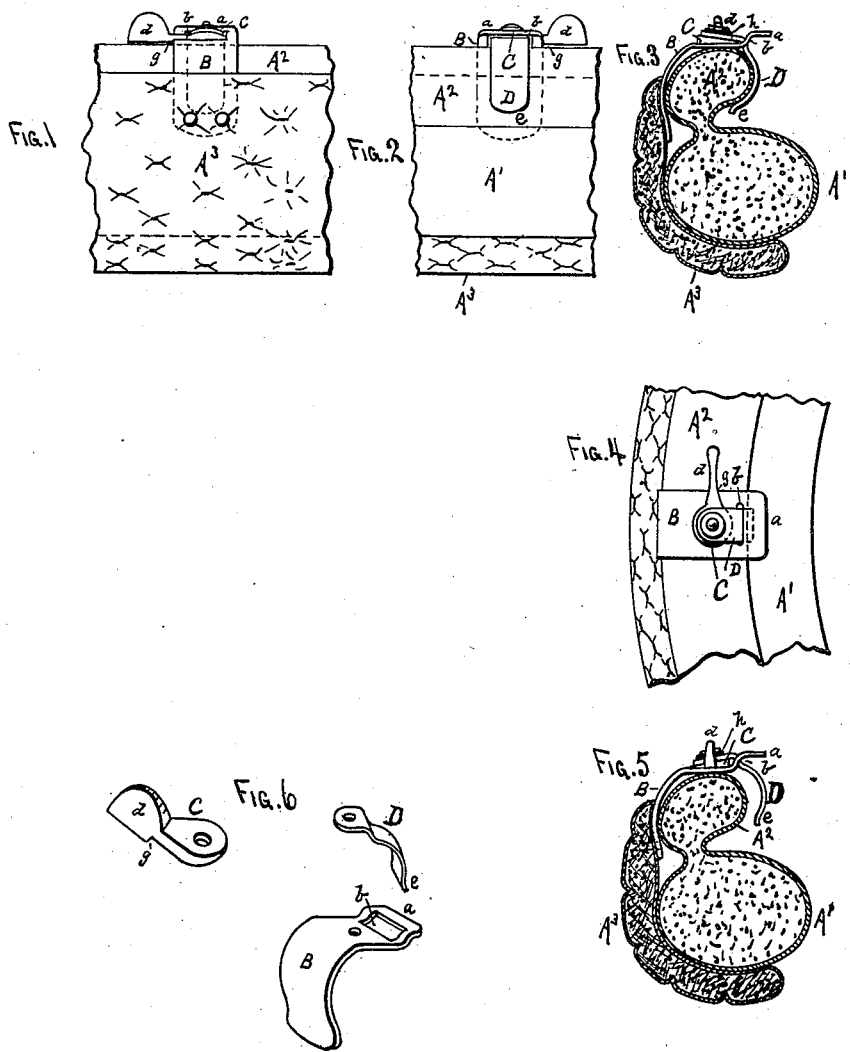

RALPH BROWNSON, OF ST. PAUL, MINNESOTA, ASSIGNOR OF ONE-HALF TO PETER R. L. HARDENBERGH, OF SAME PLACE.

HORSE-COLLAR AND SWEAT-PAD CLAMP.

SPECIFICATION forming part of Letters Patent No. 312,082, dated February 10, 1885.

Application filed July 7, 1884. (No model.)

*To all whom it may concern:*

Be it known that I, RALPH BROWNSON, a citizen of the United States, and a resident of St. Paul, in the county of Ramsey, in the State of Minnesota, have invented certain new and useful Improvements in Horse-Collar and Sweat-Pad Clamps, of which the following specification is a full, clear, and exact description, reference being also had to the accompanying drawings, in which—

Figure 1 is an inside view, Fig. 2 is an outside view, Fig. 3 is a cross-sectional view, and Fig. 4 is a plan view, of a portion of a horse-collar and sweat-pad, showing my improved clamp connecting them together, the clamp being shown closed. Fig. 5 is a cross-sectional view similar to Fig. 3, showing the clamp open. Fig. 6 is a perspective view of the parts of the clamp disconnected.

$A'$ represents a portion of the body, and $A^2$ a portion of the rim, of a horse-collar, and $A^3$ a portion of the sweat-pad, of the usual form.

Attached by rivets or otherwise to the sweat-pad $A^3$, near its ends, are two sheet-steel or other suitable metallic plates, B, (only one being shown in the drawings.) The free end of this steel plate is formed with a bent-up lip, $a$, having a slot, $b$, cut through it; and pivoted upon the steel plate, just back of this lip, is a cam-plate, C, having an outwardly-projecting thumb-lever, $d$, by which it may be turned upon the plate B. One edge of the cam-plate is made thicker than the other, and the thumb-lever $d$ is so placed that when turned in one direction at right angles to the plate B the thin edge of the cam will be toward the lip $a$, and when turned in the opposite direction the thick edge will be toward the lip.

Pivoted upon the same rivet or bolt upon which the cam C turns is a clamp-plate, D, passing through the slot $b$, and adapted to curve partially around the rim $A^2$ of the horse-collar, as shown at $e$. By this arrangement, if the cam C be turned with its thin edge toward the slot $b$, its thick edge will raise the rear end of the clamp D, and depress its lower end, $e$, around the rim $A^2$, as shown in Fig. 3, and firmly clamp and hold the sweat-pad fast to the collar. Then by simply reversing the position of the cam the thick edge will be turned in beneath the clamp D next to the slot $b$, and throw the end $e$ free from the rim $A^2$, as shown in Fig. 5, and permit the sweat-pad to be removed from the collar. A rubber or other similar suitable washer, $h$, will be interposed between the clamp-plate and the washer or burr of the rivet which holds the plates and clamps together, to receive the strains and prevent the rattling or loosening of the parts. The lower edge of the thumb-lever $d$ is formed to project down below the lower face of the cam C, as shown at $g$, to catch upon the edge of the plate B to form a stop to prevent the clamp from being turned backward by accident. The stop $g$ will "give" when force is used to move the lever $d$, but will hold the cam sufficiently strong to prevent its being turned by any means that would come in contact with it by the ordinary use of the collar. Each of the ends of the sweat-pad will be provided with one of these clamps. When the sweat-pad is made in two separate parts, one of these clamps will be used upon each end of each section.

Having described my invention and set forth its merits, what I claim is—

1. In combination with a horse-collar, a sweat-pad, $A^3$, having a plate, B, clamp D, and cam C, substantially as and for the purpose set forth.

2. The combination of the collar $A'$ $A^2$, sweat-pad $A^3$, plate B, having lip $a$ and slot $b$, and attached to said sweat-pad, cam C, having thumb-lever $d$ and stop $g$, and the clamp D, substantially as and for the purpose specified.

In testimony whereof I have hereunto set my hand in presence of two subscribing witnesses.

RALPH BROWNSON.

Witnesses:
H. E. RANDALL,
LOUIS FEESER.